(12) United States Patent
Nishiyama (10) Patent No.: US 11,680,657 B2
(45) Date of Patent: Jun. 20, 2023

(54) WATERPROOF SOLENOID VALVE

(71) Applicant: SMC CORPORATION, Tokyo (JP)

(72) Inventor: Tatsuya Nishiyama, Noda (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 17/653,968

(22) Filed: Mar. 8, 2022

(65) Prior Publication Data

US 2022/0290698 A1 Sep. 15, 2022

(30) Foreign Application Priority Data

Mar. 11, 2021 (JP) .............................. JP2021-039326

(51) Int. Cl.
*F16K 27/04* (2006.01)
*F16K 27/00* (2006.01)
(Continued)

(52) U.S. Cl.
CPC ............ *F16K 27/041* (2013.01); *F16K 11/20* (2013.01); *F16K 27/003* (2013.01); *F16K 27/12* (2013.01);
(Continued)

(58) Field of Classification Search
CPC ................ F15B 13/0422; F15B 13/081; F15B 13/0814; F15B 13/0817; F15B 13/0821; F15B 13/0825; F15B 13/0828; F15B 13/0839; F15B 20/002; F15B 2211/324; F15B 2211/423; F15B 2211/523; F15B 2211/895; F16K 11/16; F16K 27/003; F16K 27/041; F16K 27/048; F16K 27/12; F16K 31/06; F16K 11/10; F16K 11/14; F16K 11/161; F16K 11/18; F16K 11/185;
(Continued)

(56) References Cited

U.S. PATENT DOCUMENTS 5,603,350 A * 2/1997 Stoll .................... F15B 13/0817
137/884
8,991,429 B2 * 3/2015 Yoshimoto ............. G05G 9/047
137/636.1
(Continued)

FOREIGN PATENT DOCUMENTS

EP 1 294 489 B1 1/2008
EP 3 587 879 A1 1/2020
(Continued)

OTHER PUBLICATIONS

Extended European Search Report dated Aug. 12, 2022 in European Patent Application No. 22157881.8, 7 pages.

*Primary Examiner* — Kenneth Rinehart
*Assistant Examiner* — Jonathan J Waddy
(74) *Attorney, Agent, or Firm* — Oblon, McClelland, Maier & Neustadt, L.L.P.

(57) ABSTRACT

A waterproof cover includes an operation unit for pressing a manual button of a solenoid valve main body. The operation unit includes a flexible cap, a pin guide interposed between the cap and the solenoid valve main body, and an operation pin that is inserted in guide hole of the pin guide so as to be displaced freely. The cap includes a flexible pressing portion for a pressing operation. One end of the operation pin is in contact with or close to the pressing portion, and the other end of the operation pin is in contact with the manual button.

6 Claims, 8 Drawing Sheets

(51) Int. Cl.
  *F16K 27/12* (2006.01)
  *F16K 11/20* (2006.01)
  *F16K 31/60* (2006.01)
  *F16K 31/06* (2006.01)
  *F16K 31/124* (2006.01)

(52) U.S. Cl.
  CPC .......... *F16K 31/06* (2013.01); *F16K 31/1245* (2013.01); *F16K 31/60* (2013.01)

(58) Field of Classification Search
  CPC .......... F16K 11/20; F16K 11/22; F16K 27/04; F16K 27/08; F16K 31/60; F16K 31/124; F16K 31/1245; G05G 1/02
  See application file for complete search history.

(56) References Cited

U.S. PATENT DOCUMENTS

| | | | |
|---|---|---|---|
| 2007/0137708 A1* | 6/2007 | Kuhbauch | F15B 13/0821 137/269 |
| 2015/0053290 A1 | 2/2015 | Hamm et al. | |
| 2019/0258285 A1* | 8/2019 | Burchard | G05G 13/00 |
| 2020/0049169 A1 | 2/2020 | Miyazoe et al. | |
| 2022/0113754 A1* | 4/2022 | Beneventi | H01F 7/081 |
| 2022/0236759 A1* | 7/2022 | Gorai | H01H 13/20 |

FOREIGN PATENT DOCUMENTS

| | | |
|---|---|---|
| JP | 2018-135963 A | 8/2018 |
| WO | WO 02/092238 A1 | 11/2002 |

\* cited by examiner

WATERPROOF SOLENOID VALVE

TECHNICAL FIELD

The present invention relates to waterproof solenoid valves having a waterproofing property.

BACKGROUND ART

Waterproof solenoid valves with a waterproofing property are well known as disclosed in Patent Literature (PTL) 1. The waterproof solenoid valves are often mounted in food processing machines for use, and after the operation of the food processing machines are finished, are cleaned by a blow of high-temperature high-pressure cleaning water, steam jets, or the like. For that reason, the waterproof solenoid valves have a structure in which the solenoid valve main body is covered with a waterproof manifold and a waterproof cover to withstand the injection of the cleaning water, steam jets, or the like.

The solenoid valve main body is equipped with a manual button so that the valve member can be manually switched during power outage, maintenance and inspections, or the like. For this reason, the waterproof cover has an operation unit for pressing the manual button via the waterproof cover. The operation unit is generally configured such that a window hole is provided at part of the waterproof cover, a cap made of a flexible material, such as rubber or synthetic resin, is attached to the window hole in a liquidtight manner, an operation pin is interposed between the cap and the manual button of the solenoid valve main body, and the manual button can be pressed via the operation pin by pressing the operation pin from the top of the cap.

However, it was found that, in the case where an end of the operation pin is slidably inserted and held in a holding hole formed in the cap to stably dispose the operation pin between the cap and the manual button, the sliding performance of the operation pin is deteriorated by the friction between the operation pin and the cap, which makes it difficult for the cap and the operation pin to return to the initial positions after a pressing operation.

CITATION LIST

Patent Literature

PTL 1: Japanese Unexamined Patent Application Publication No. 2018-135963

SUMMARY OF INVENTION

Technical Problem

A technical object of the present invention is to provide a waterproof solenoid valve with a simple and rational structure in which an operation pin can be stably disposed between the cap and the manual button and in which the cap and the operation pin can be reliably returned to the initial positions after a pressing operation.

Solution to Problem

To attain the above object, the present invention provides a waterproof solenoid valve in which one or more solenoid valve main bodies including a valve member that switches a channel, an electromagnetically driving mechanism that drives the valve member, and one or more manual buttons capable of manually switching the valve member are mounted on a manifold with a waterproof structure, the waterproof solenoid valve being covered with a waterproof cover attached to the manifold in a liquidtight manner, wherein the waterproof cover includes, at a portion covering the manual button of the solenoid valve main body, an operation unit for pressing the manual button in a direction of a central axis, wherein the operation unit includes a cap with flexibility attached to the waterproof cover in a liquidtight manner, a pin guide interposed between the cap and the solenoid valve main body, one or more operation pins inserted in a guide hole of the pin guide so as to be freely displaceable in the direction of the central axis, wherein the cap includes a flexible pressing portion that is elastically deformed at a pressing operation, and wherein one end of the operation pin is in contact with or close to the pressing portion of the cap, and another end of the operation pin is in contact with the manual button.

In the present invention, preferably, the cap includes a hollow body and a head that covers one end of the body, the head including the pressing portion, and the pin guide is fitted in the body of the cap and engages with the body.

Preferably, the pin guide includes a first guide that is press-fitted in the body and a second guide connecting to the first guide, wherein an outside diameter of the second guide is larger than an outside diameter of the first guide, wherein the guide hole passes through the first guide and the second guide, wherein the first guide has a locking groove around its outer periphery, and wherein part of the body of the cap is fitted and retained in the locking groove, so that the pin guide is retained by the cap.

Preferably, the body of the cap is fitted in an operation hole formed in the waterproof cover, the first guide of the pin guide is press-fitted in the body to reach a position of the operation hole, and the body is strongly pressed between the first guide and an inner periphery of the operation hole to enhance a sealing performance between the cap and waterproof cover.

In the present invention, the operation pin may be inserted into the guide hole from one end of the pin guide, and the operation pin and the pin guide may have a falling prevention mechanism for preventing the operation pin inserted in the guide hole from falling off the pin guide.

Preferably, the falling prevention mechanism includes a window hole formed at a side wall of the guide hole so as to be elongated in the direction of the central axis, a locking portion formed at one end of the window hole, and a locking claw that is formed at a side of the operation pin and is fitted in the window hole so as to be displaced freely, and the locking claw engages with the locking portion to prevent the operation pin from falling off the guide hole.

In the present invention, the solenoid valve main body may include two manual buttons, the pin guide may include two of the first guides, two of the second guides, and two of the guide holes, wherein two of the operation pins may be individually inserted in the two guide holes, the two first guides may be separated from each other, and sides of the two second guides may be connected together, and the body of the cap may include two fitting portions in which the two first guides of the pin guide are individually fitted.

Alternatively, the solenoid valve main body may include one manual button, the pin guide may include two of the first guides, two of the second guides, and two of the guide holes, wherein two of the operation pins may be individually inserted in the two guide holes, the two first guides may be separated from each other, and sides of the two second guides may be connected together, and the body of the cap may include two fitting portions in which the two first guides of the pin guide are individually fitted, and wherein, of the two operation pins, one operation pin corresponding to the manual button may be displaced freely, and another operation pin may be fixed in a non-displaceable state.

Advantageous Effects of Invention

According to the present invention, the operation pins can be stably disposed between the cap and the manual buttons by supporting the operation pins with the pin guide so that it can be displaced freely.

Furthermore, the operation pins are supported by the pin guide so as to be freely displaced, one end of which is merely in contact with the head of the cap, and the other end is also in contact with the manual button, not sliding relative to the cap, which prevents the operation pins and the cap from being affected by sliding friction serving as resistance. For this reason, the operation of the operation pins is very smooth, and the deformation and restoration of the pressing portions of the cap are also very smooth.

DESCRIPTION OF EMBODIMENTS

FIGS. 1 to 8 illustrate a first embodiment of a waterproof solenoid valve according to the present invention. The waterproof solenoid valve 1 is configured such that one solenoid valve main body 3 is mounted on a manifold 2 with a waterproof structure and that the solenoid valve main body 3 is covered with a waterproof cover 4.

Figure 1:
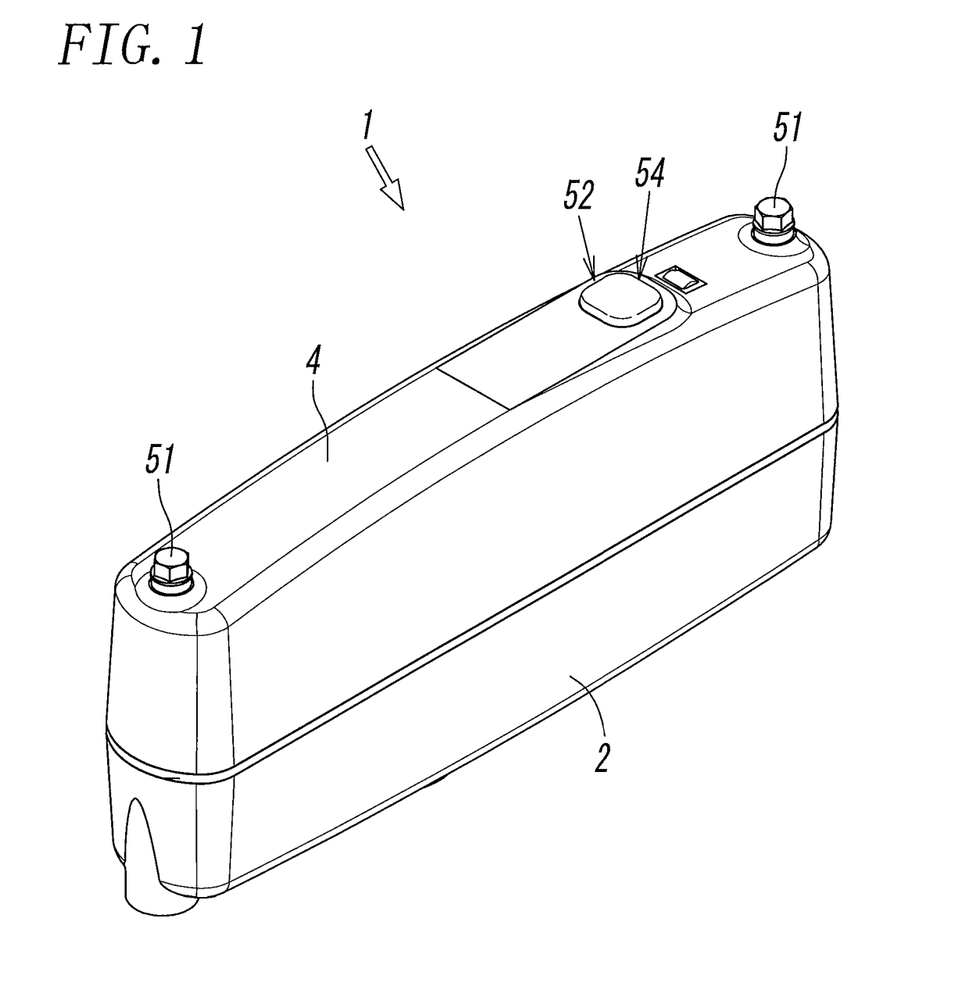
FIG. 1 is a perspective view of a first embodiment of a waterproof solenoid valve according to the present invention.
Figure 2:
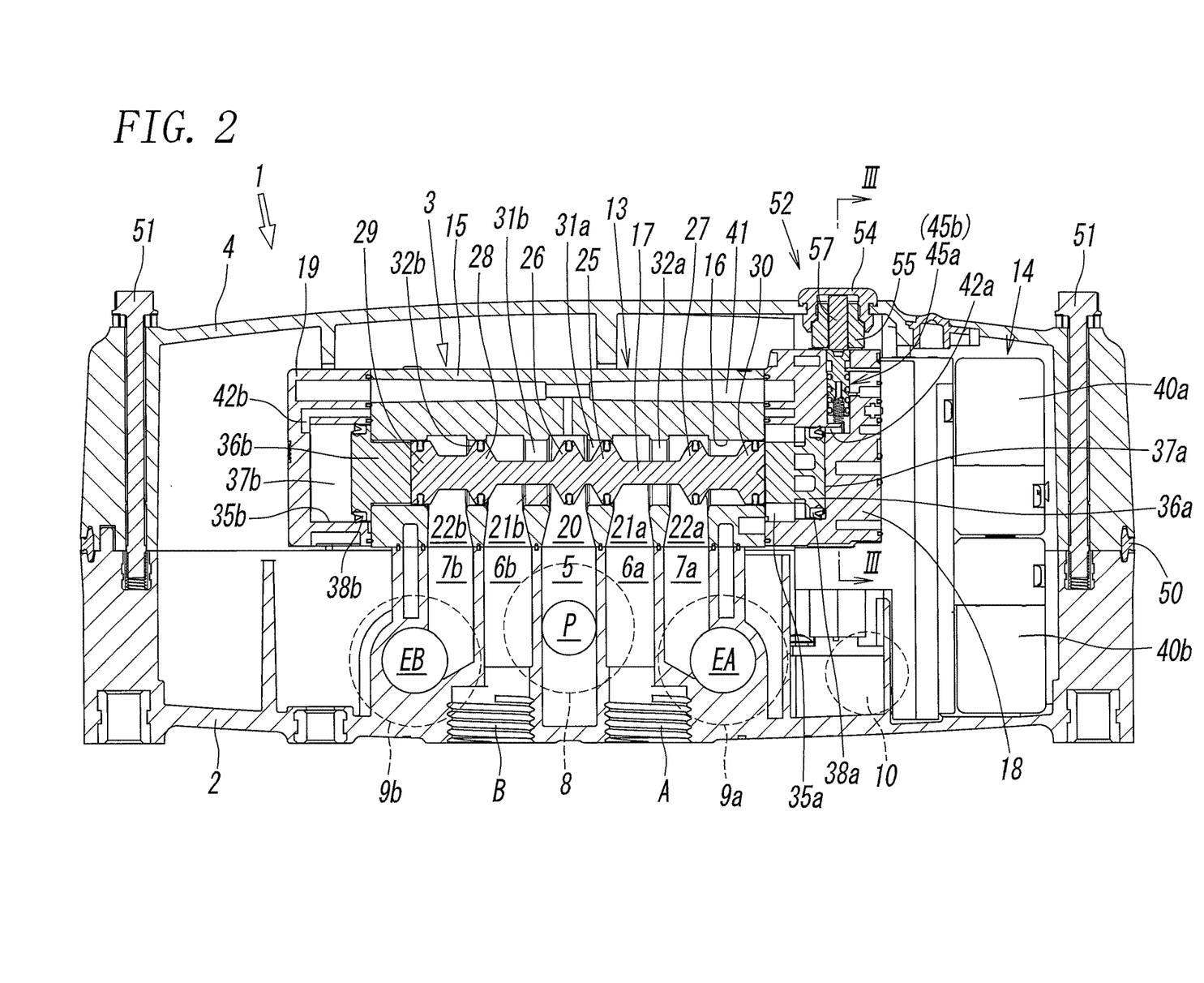
FIG. 2 is a vertical cross-sectional view of the waterproof solenoid valve in FIG. 1 taken in the vertical direction at the center in the width direction.
Figure 3:
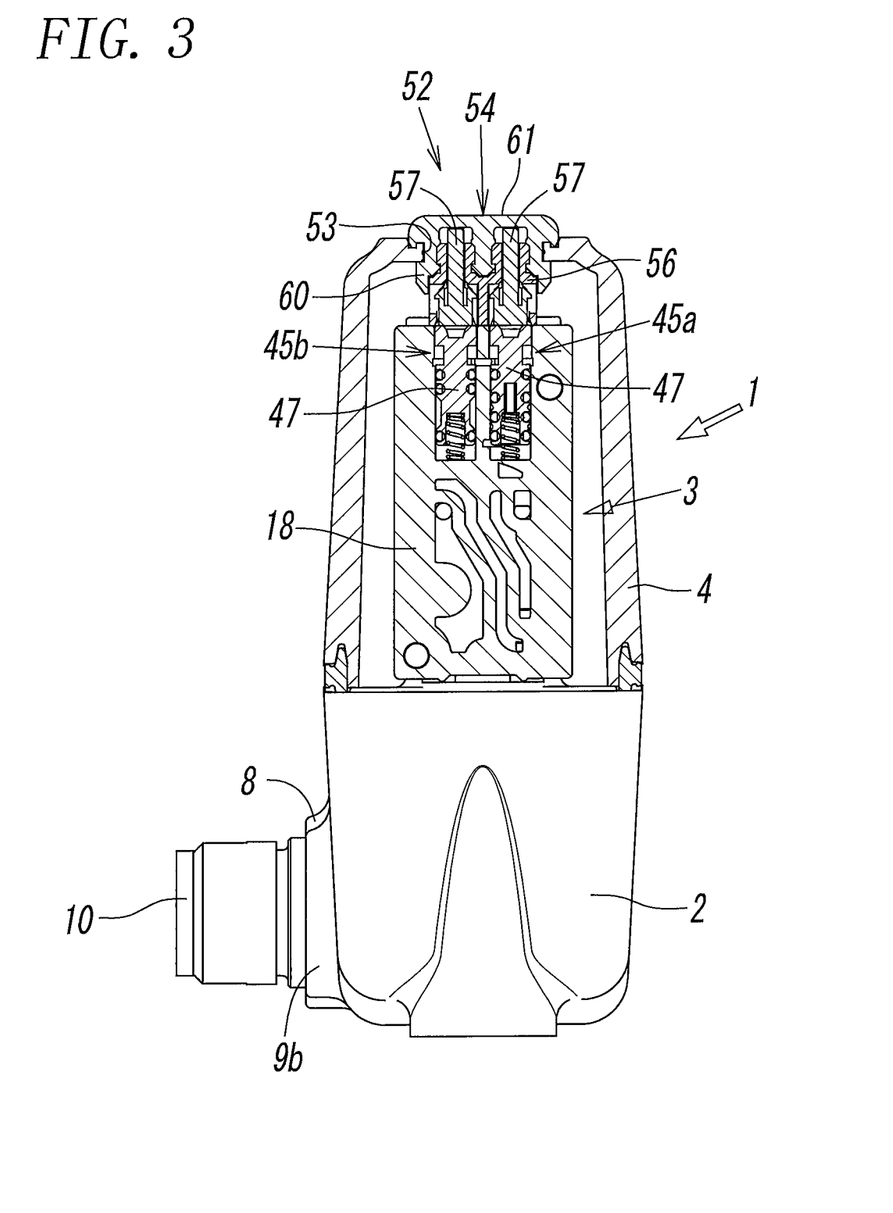
FIG. 3 is an enlarged cross-sectional view taken along line III-III of FIG. 2.
Figure 4:
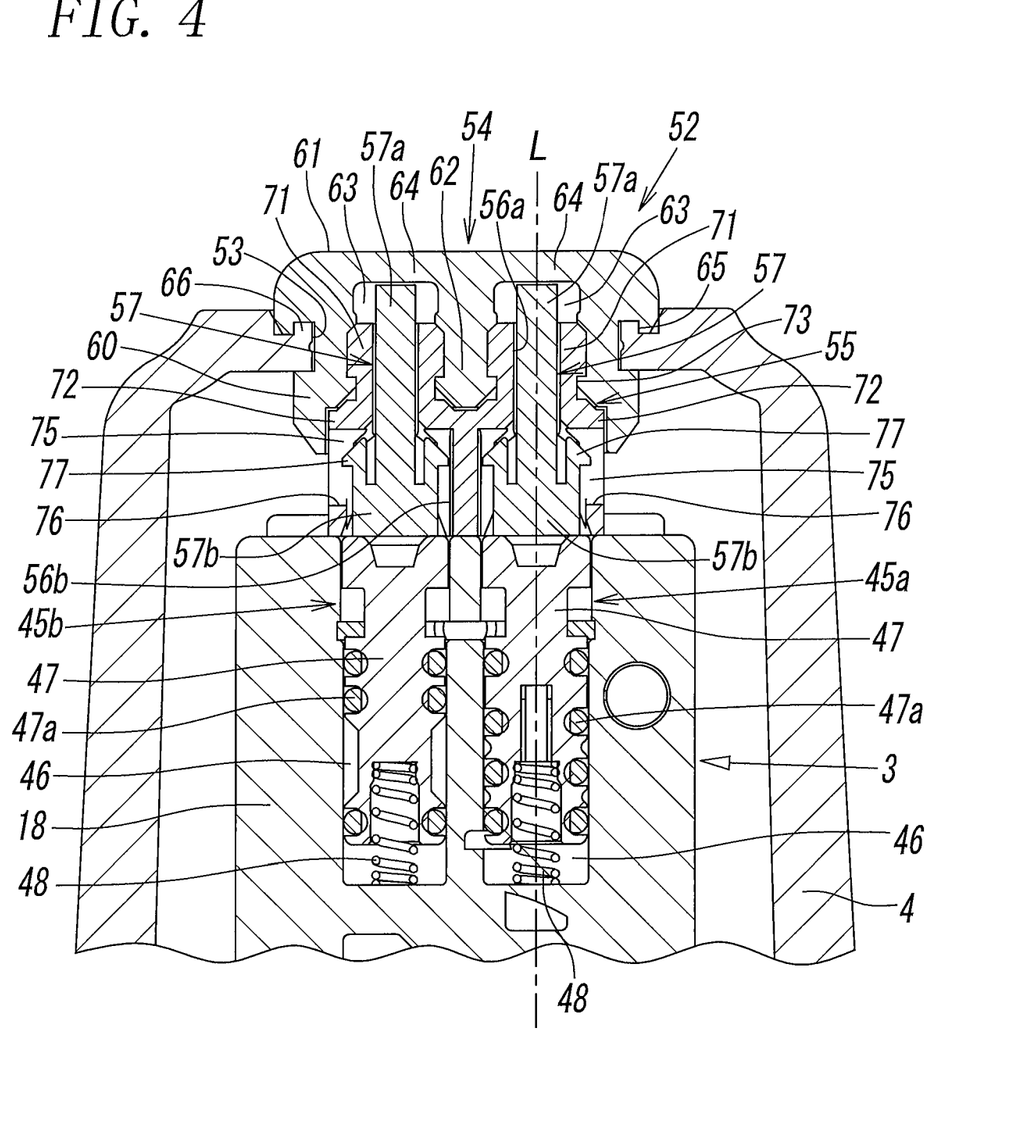
FIG. 4 is an enlarge view of a relevant part of FIG. 3.

The manifold 2 is a stand-alone manifold made of a hard material with excellent heat resistance and water resistance properties, such as metal or synthetic resin. As shown in FIG. 2, the manifold 2 houses a supply channel 5 at the center, a first output channel 6a and a second output channel 6b located on both sides of the supply channel 5, and a first discharge channel 7a and a second discharge channel 7b located on both outsides of the first output channel 6a and the second output channel 6b, which are open to the top of the manifold 2.

The supply channel 5 communicates with a supply port P of a supply joint 8 for piping connection protruding to one side of the manifold 2. The first discharge channel 7a communicates with a first discharge port EA of a first discharge joint 9a next to the supply joint 8. The second discharge channel 7b communicates with a second discharge port EB of a second discharge joint 9b next to the supply joint 8 on the opposite side of the first discharge joint 9a. The first output channel 6a communicates with a first output port A that opens to the bottom of the manifold 2. The second output channel 6b communicates with a second output port B that opens to the bottom of the manifold 2. The portion with reference sign 10 in FIG. 2 is a connector for connecting electrical wiring.

The pressure fluid used in this embodiment is air, but liquid may be used.

Figure 7:
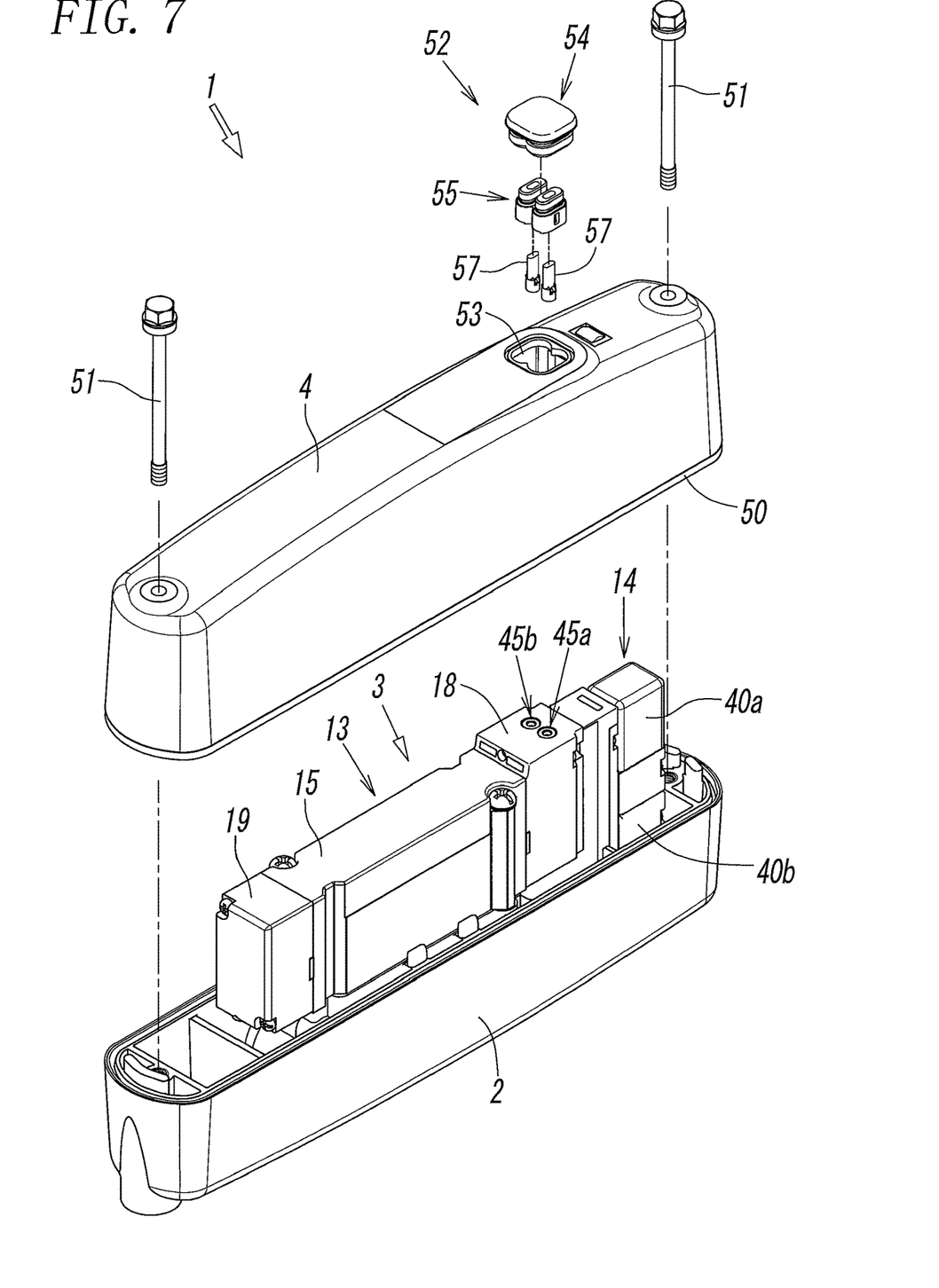
FIG. 7 is an exploded perspective view of FIG. 1.
Figure 8:
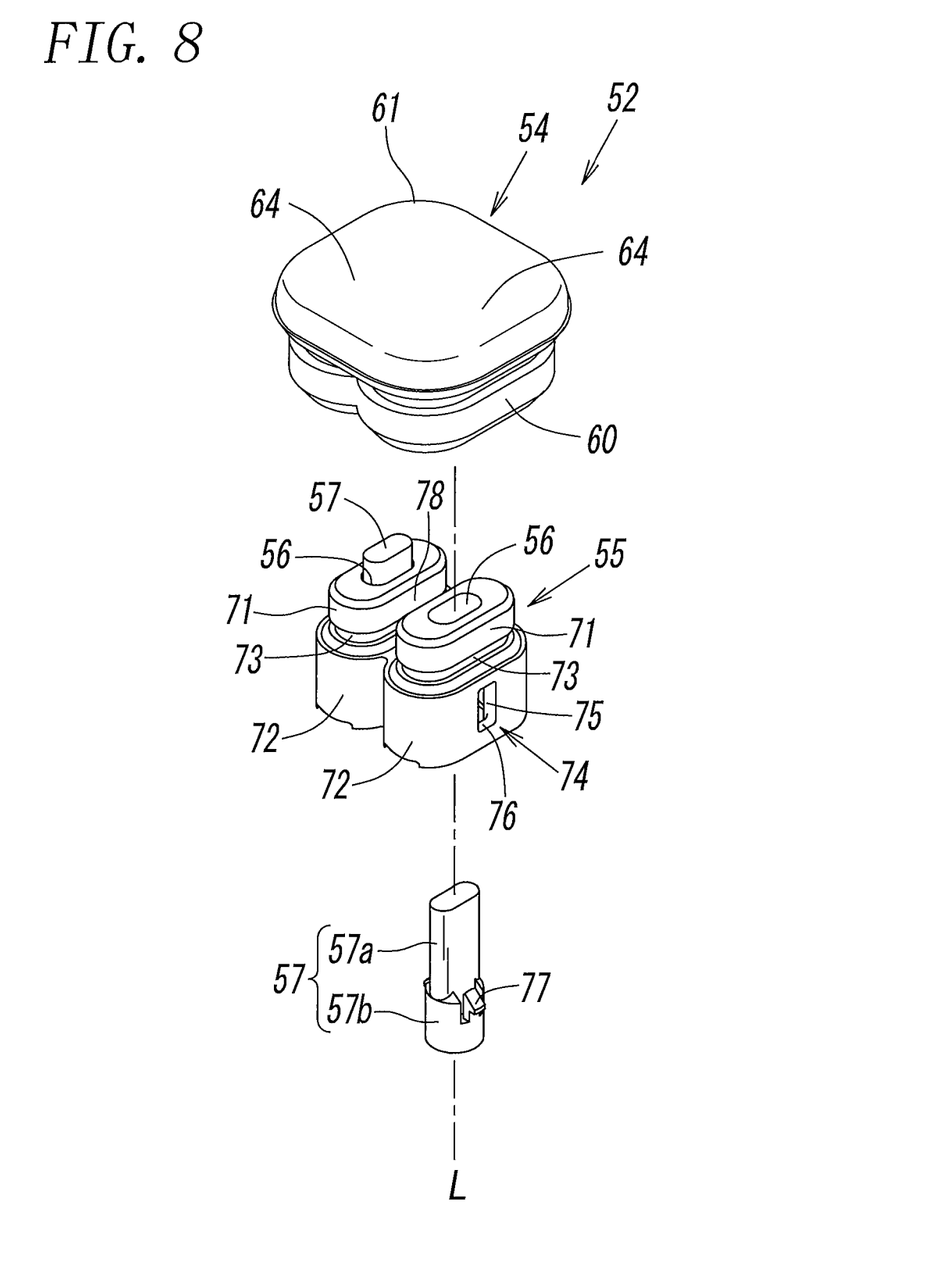
FIG. 8 is an enlarged perspective view of part of FIG. 7.

The solenoid valve main body 3 is a double-pilot five-port connection valve, which includes a main valve 13 and an electromagnetically driving mechanism 14, as shown in FIGS. 2 and 7.

The main valve 13 includes a valve body 15, a valve hole 16 formed in the valve body 15, a valve member, that is, a spool 17, which is slidably housed in the valve hole 16, a manual block 18 attached to one end of the valve body 15, and an end block 19 attached to the other end of the valve body 15.

The valve body 15 includes a supply port 20 that connects the supply channel 5 of the manifold 2 to the valve hole 16, a first output port 21a and a second output port 21b that individually connect the first output channel 6a and second output channel 6b to the valve hole 16, and a first discharge port 22a and a second discharge port 22b that individually connect the first discharge channel 7a and the second discharge channel 7b to the valve hole 16.

The spool 17 includes four switch lands 25, 26, 27, and 28 for switching the channel and two seal lands 29 and 30 that close the opposite ends of the valve hole 16. A sealing member is attached to each of the outer peripheries of the switch lands 25 to 28 and the seal lands 29 and 30.

Of the four switch lands 25, 26, 27, and 28, the first switch land 25 near the center of the spool 17 opens and closes a first supply communication path 31a connecting the supply channel 5 and the first output channel 6a, the second switch land 26 opens and closes a second supply communication path 31b connecting the supply channel 5 and second output channel 6b, the third switch lands 27 near one end of the spool 17 opens and closes a first discharge communication path 32a connecting the first output channel 6a and the first discharge channel 7a, and the fourth switch land 28 near the other end of the spool 17 opens and closes a second discharge communication path 32b connecting the second output channel 6b and the second discharge channel 7b.

The manual block 18 has therein a first piston chamber 35a, in which a first pilot piston 36a is slidably housed via a sealing member 38a, and a first pilot pressure chamber 37a for applying pilot fluid pressure to the first pilot piston 36a.

The end block 19 has therein a second piston chamber 35b, in which a second pilot piston 36b is slidably housed via a sealing member 38b, and a second pilot pressure chamber 37b for applying pilot fluid pressure to the second pilot piston 36b.

The electromagnetically driving mechanism 14 includes a solenoid operated three-port connection first pilot valve 40a and second pilot valve 40b in parallel at vertically two positions.

The first pilot valve 40a is connected between a pilot supply path 41 that branches off the supply port 20 and a first pilot communication path 42a communicating with the first pilot pressure chamber 37a through a channel (not shown).

When the first pilot valve 40a is turned on, the pilot supply path 41 communicates with the first pilot communication path 42a through the first pilot valve 40a. This causes the pilot fluid from the supply port 20 to be supplied to the first pilot pressure chamber 37a to displace the spool 17 to the left in FIG. 2 to change to the operation position opposite to that in FIG. 2. As a result, the supply channel 5 and the first output channel 6a communicate with each other, the second output channel 6b and the second discharge channel 7b communicate with each other, and the first discharge channel 7a is blocked.

When the first pilot valve 40a is turned off, the pilot supply path 41 is separated from the first pilot communication path 42a. This causes the supply of the pilot fluid to the first pilot pressure chamber 37a to be stopped, and the pressure fluid in the first pilot pressure chamber 37a to be discharged to the outside through the first pilot communication path 42a via the first pilot valve 40a.

In contrast, the second pilot valve 40b is connected between the pilot supply path 41 and the second pilot communication path 42b communicating with the second pilot pressure chamber 37b through a channel (not shown).

When the second pilot valve 40b is turned on, the pilot supply path 41 communicates with the second pilot communication path 42b via the second pilot valve 40b. This causes the pilot fluid from the supply port 20 to be supplied to the second pilot pressure chamber 37b to switch the spool 17 to the operation position in FIG. 2. As a result, the supply channel 5 and the second output channel 6b communicate with each other, the first output channel 6a and the first discharge channel 7a communicate with each other, and the second discharge channel 7b is blocked.

When the second pilot valve 40b is turned off, the pilot supply path 41 is separated from the second pilot communication path 42b. This causes the supply of the pilot fluid to the second pilot pressure chamber 37b to be stopped, and the pressure fluid in the second pilot pressure chamber 37b to be discharged to the outside through the second pilot communication path 42b via the second pilot valve 40b.

As is apparent from FIGS. 2 to 7, the manual block 18 includes two manual units 45a and 45b, with which the spool 17 can be manually switched, next to each other in the width direction of the manual block 18.

Each of the manual units 45a and 45b has a button hole 46 that opens to the upper end face of the manual block 18. The button hole 46 houses a shaft-shaped manual button 47 so that the manual button 47 can freely slide in the direction of the central axis L of the button hole 46 via a plurality of sealing members 47a for switching the channel. Between the manual button 47 and the bottom of the button hole 46, a coil-shaped return spring 48 that urges the manual button 47 to the initial position (non-operation position) is interposed.

Of the two manual units 45a and 45b, one first manual unit 45a is connected between the pilot supply path 41 and the first pilot communication path 42a substantially in parallel with the first pilot valve 40a. The manual button 47 of the first manual unit 45a is normally at the initial position shown in FIG. 4 to cut off the pilot supply path 41 and the first pilot communication path 42a from each other at the position of the button hole 46 and connect the first pilot communication path 42a to the first pilot valve 40a. When the manual button 47 is pressed to the operation position shown in FIG. 5, the manual button 47 separates the first pilot communication path 42a from the first pilot valve 40a and connects it to the pilot supply path 41. This causes the pilot fluid from the supply port 20 to be directly supplied to the first pilot pressure chamber 37a through the pilot supply path 41, the button hole 46, and the first pilot communication path 42a.

When the pressing of the manual button 47 of the first manual unit 45a is released, the manual button 47 is returned to the initial position by the spring force of the return spring 48 to separate the first pilot communication path 42a from the pilot supply path 41 and connect it to the first pilot valve 40a.

The other second manual unit 45b is connected between the pilot supply path 41 and the second pilot communication path 42b substantially in parallel with the second pilot valve 40b. The manual button 47 of the second manual unit 45b is normally at the initial position shown in FIG. 4 to cut off the pilot supply path 41 and the second pilot communication path 42b from each other at the position of the button hole 46 and connect the second pilot communication path 42b to the second pilot valve 40b. When the manual button 47 is pressed to the operation position shown in FIG. 6, the manual button 47 separates the second pilot communication path 42b from the second pilot valve 40b and connects it to the pilot supply path 41. This cause the pilot fluid from the supply port 20 to be directly supplied to the second pilot pressure chamber 37b through the pilot supply path 41, the button hole 46, and the second pilot communication path 42b.

When the pressing of the manual button 47 of the second manual unit 45b is released, the manual button 47 is returned to the initial position by the spring force of the return spring 48 to separate the second pilot communication path 42b from the pilot supply path 41 and connect it to the second pilot valve 40b.

Both the configuration and operation of the first pilot valve 40a and the second pilot valve 40b and the configuration and operation of the first manual unit 45a and the second manual unit 45b described above are well known in solenoid valves. Accordingly, specific arrangement of the pilot supply path 41, and the first pilot communication path 42a, the second pilot communication path 42b, and so on is not shown.

The waterproof cover 4 is made of a hard material with excellent heat resistivity and water resistance, such as metal or synthetic resin, which has an inverted U-shaped cross section and is attached to the upper surface of the manifold 2 with two bolts 51 and 51 via a gasket 50 in a liquidtight manner. The waterproof cover 4, if made of synthetic resin, may be partly transparent or translucent.

On the upper surface of the waterproof cover 4, an operation unit 52 for pressing the manual buttons 47 is formed at a portion covering the manual units 45a and 45b of the solenoid valve main body 3. As shown in FIGS. 3 to 8, the operation unit 52 includes a cap 54 with flexibility attached in an operation hole 53 of the waterproof cover 4 in a liquidtight manner, a pin guide 55 interposed between the cap 54 and the solenoid valve main body 3, two guide holes 56 and 56 formed in the pin guide 55 and parallel to each other along the central axis L of the two button holes 46, and two operation pins 57 and 57 individually inserted into the two guide holes 56 and 56 so as to be freely displaced in the direction of the central axis L.

The cap 54 is made of a material that is flexibly, elastically deformable and has high heat resistance and sealing properties, such as rubber or synthetic resin, and includes a hollow body 60 that is rectangular in plan view and is to be fitted in the operation hole 53 and a head 61 covering an end (upper end) of the body 60.

The body 60 houses two elliptic fitting portions 63 and 63 next to each other with a partition wall 62 therebetween. The inside diameters of the fitting portions 63 and 63 in the longitudinal direction and the lateral direction are almost constant in the depth direction of the fitting portions 63 and 63.

The head 61 has pressing portions 64 and 64 that are elastically deformed at a pressing operation at portions covering the two fitting portions 63 and 63. In the lower surface of the head 61, a recessed groove 65 is formed so as to surround the body 60. A protruding wall 66 formed around the edge of the operation hole 53 of the waterproof cover 4 is fitted in the recessed groove 65 in a liquidtight manner.

The pin guide 55 includes two first guides 71 and 71 with an elliptical shape in plan view and two second guides 72 and 72 with an elliptical shape in plan view under the individual first guides 71 and 71. The two first guides 71 and 71 are in parallel with each other via a clearance 78 between the side walls in which the partition wall 62 of the cap 54 is to be fitted. The side walls of the two second guides 72 and 72 are connected together. Accordingly, the outside diameters in the longitudinal direction and in the lateral direction of the ellipse of the second guide 72 is larger than the outside diameters in the longitudinal direction and in the lateral direction of the first guide 71.

The pin guide 55 is attached to the cap 54 by press-fitting the two first guides 71 and 71 into the two fitting portions 63 and 63 formed in the body 60 of the cap 54, respectively, and is disposed between the cap 54 and the solenoid valve main body 3 by bringing the bottom surface of the pin guide 55 into contact with the upper surface of the manual block 18.

To prevent the pin guide 55 and the cap 54 from separating from each other, the outside diameter of the first guide 71 is formed slightly larger than the inside diameter of the fitting portion 63, and a locking groove 73 is formed around the outer periphery of the base end portion of the first guide 71. The first guide 71 is press-fitted into the fitting portion 63 while press-expanding the body 60 so that part of the body 60 is fitted and engaged into the locking groove 73 using the reactive force (contractive force) of the press-expanded body 60, thereby locking the cap 54 and the pin guide 55 to each other. The lower end of the body 60 covers part of the upper ends of the two second guides 72 and 72.

The first guides 71 and 71 are press-fitted into the fitting portions 63 and 63 to reach the position of the operation hole 53. This causes the body 60 to be strongly pressed between the first guides 71 and 71 and the inner periphery of the operation hole 53 of the waterproof cover 4, thereby further enhancing the waterproof performance between the cap 54 and the waterproof cover 4.

The pin guide 55 is desirably formed of a material with high heat-resisting properties, for example, polyphenylene sulfide (PPS).

The guide holes 56 are formed so as to vertically pass through the centers of the first guide 71 and the second guide 72. The transverse cross sectional shape of the guide hole 56 is not constant over the entire length of the guide hole 56. The transverse cross sectional shape of a first hole portion 56a passing through the first guide 71 is elliptical in the longitudinal direction of the first guide 71. The transverse cross sectional shape of a second hole portion 56b passing through the second guide 72 is circular.

The operation pin 57 includes a first pin portion 57a at the distal end (upper end) and a second pin portion 57b at the base end (lower end). The first pin portion 57a has an elliptical cross-sectional shape and is fitted in the first hole portion 56a of the guide hole 56 in the first guide 71. The second pin portion 57b has a columnar shape and is fitted in the second hole portion 56b of the guide hole 56 in the second guide 72. The distal end of the first pin portion 57a protrudes from the guide hole 56 into contact with the lower surface of the pressing portion 64 of the cap 54 or close thereto with a slight clearance kept. The base end portion of the second pin portion 57b is in contact with the upper surface of the manual button 47. Thus, the operation pin 57 and the cap 54 are configured not to have a sliding portion when the operation pin 57 is pressed via the cap 54.

The inside diameter of the guide hole 56 is set to allow the operation pin 57 to be inserted with some margin so that the operation pin 57 can be smoothly displaced without sliding resistance.

The operation pin 57 is inserted into the guide hole 56 of the pin guide 55 pressed into the cap 54 from the bottom of the pin guide 55 in a state in which the waterproof cover 4 is detached from the manifold 2, and thereafter, the waterproof cover 4 is attached to the manifold 2. To prevent the operation pin 57 from falling off the pin guide 55 between the time when the operation pin 57 is inserted into the guide hole 56 and the time when the waterproof cover 4 is attached to the manifold 2, a falling prevention mechanism 74 is provided.

The falling prevention mechanism 74 includes a window hole 75 formed in the side wall of the guide hole 56 so as to be elongated in the direction of the central axis L, a locking portion 76 formed at an end (lower end) of the window hole 75, and a locking claw 77 formed at the side of the second pin portion 57b of the operation pin 57. The locking claw 77 is engaged with the locking portion 76 by inserting the operation pin 57 into the guide hole 56 from the first pin portion 57a side and fitting the locking claw 77 into the window hole 75 in a state in which the locking claw 77 is elastically deformed to the central axis L side, so that falling of the operation pin 57 from the guide hole 56 is prevented.

In the illustrated example, the locking claw 77 is formed at one side and the opposite side of the operation pin 57, two in total. The locking claw 77 may be formed only at the side on which the window hole 75 and the locking portion 76 are formed. Alternatively, two sets of the window hole 75 and the locking portion 76 may be formed at opposing positions of the side of the guide hole 56 in accordance with the two locking claws 77.

Thus, by supporting the operation pins 57 with the pin guide 55, the operation pins 57 can be stably disposed between the cap 54 and the manual buttons 47.

Figure 5:
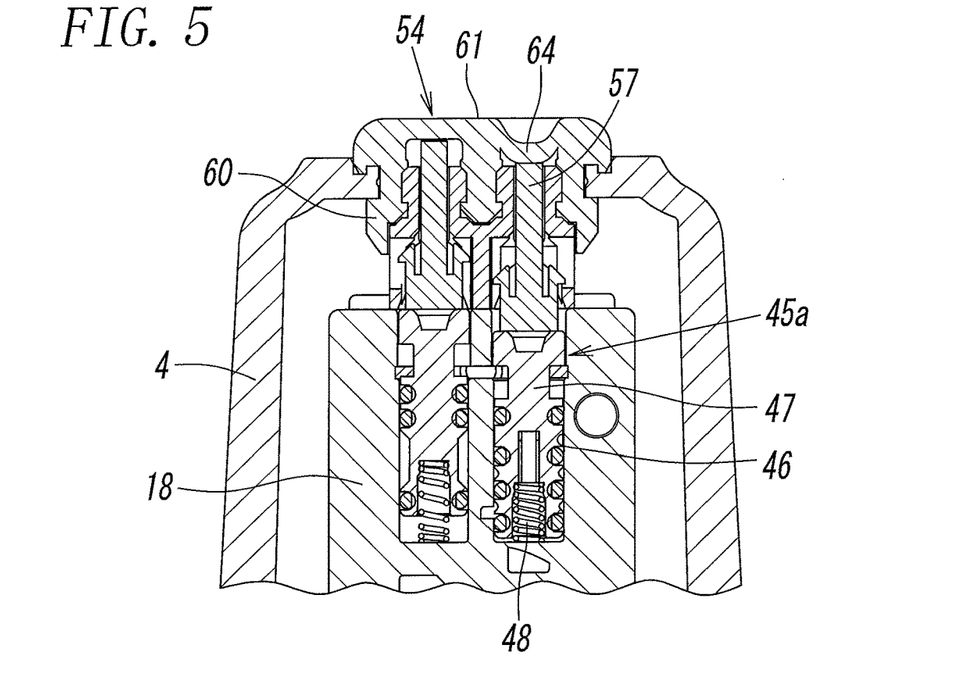
FIG. 5 is a cross-sectional view of the relevant part in which one manual button is pressed from the state in FIG. 4.
Figure 6:
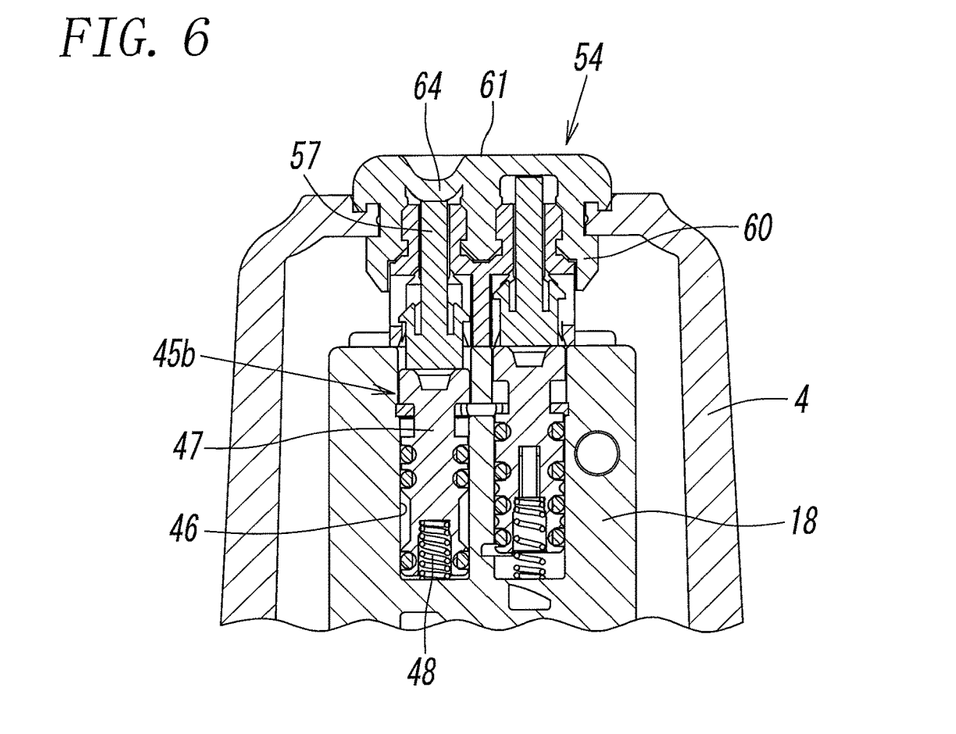
FIG. 6 is a cross-sectional view of the relevant part in which the other manual button is pressed from the state in FIG. 4.

With this configuration of the operation unit 52, the manual button 47 can be pressed via the operation pin 57 by pressing to deform the pressing portion 64 of the head 61 of the cap 54 with a tool or a finger, as shown in FIGS. 5 and 6. When the pressing of the pressing portion 64 is released, the pressing portion 64, the operation pin 57, and the manual button 47 are returned to the initial positions by the spring force of the return spring 48 and the restoring force of the pressing portion 64.

Since the operation pin 57 is supported by the pin guide 55 so as to be freely displaced, is merely in contact with the head 61 of the cap 54 at one end, and does not have a portion that slides relative to the cap 54, the operation of the operation pin 57 is very smooth. The deformation and restoration of the pressing portion 64 of the cap 54 are also very smooth because the pressing portion 64 is not affected by the friction with the operation pin 57.

The waterproof solenoid valve 1 of the first embodiment includes two manual units 45a and 45b because the solenoid valve main body 3 is of a double pilot type. Alternatively, the solenoid valve main body 3 may be of a single pilot type including one pilot valve. In this case, the operation unit 52 includes one operation pin 57 because the solenoid valve main body 3 includes only one manual unit. In other words, the cap 54 includes one fitting portion 63 and one pressing portion 64, the pin guide 55 includes one first guide 71, one second guide 72, and one guide hole 56.

Alternatively, if the manual block 18 for use in the double pilot solenoid valve main body 3 is employed for the manual block of a single pilot solenoid valve main body, the cap 54 including the two fitting portions 63 and 63 and the two pressing portions 64 and 64, the pin guide 55 including the two first guides 71 and 71, the two second guides 72 and 72, and the two guide holes 56 and 56, and the two operation pins 57 and 57 may be used, as in the first embodiment, and only one operation pin 57 corresponding to a manual button that operates effectively may be utilized, with the other operation pin 57 fixed in a non-displaceable state.

While in the first embodiment one solenoid valve main body 3 is mounted on the manifold 2, the present invention can also be applied to a waterproof solenoid valve in which a plurality of solenoid valve main bodies is mounted on a manifold. In this case, the plurality of solenoid valve main bodies may be individually covered with a waterproof cover or all of the solenoid valve main bodies may be covered with one waterproof cover. Alternatively, the plurality of solenoid valve main bodies 3 may be divided into several groups, as is a waterproof solenoid valve 100 of the second embodiment shown in FIG. 9, and a plurality of solenoid valve main bodies 3 of each group may be covered with the waterproof cover 4 altogether.

Figure 9:
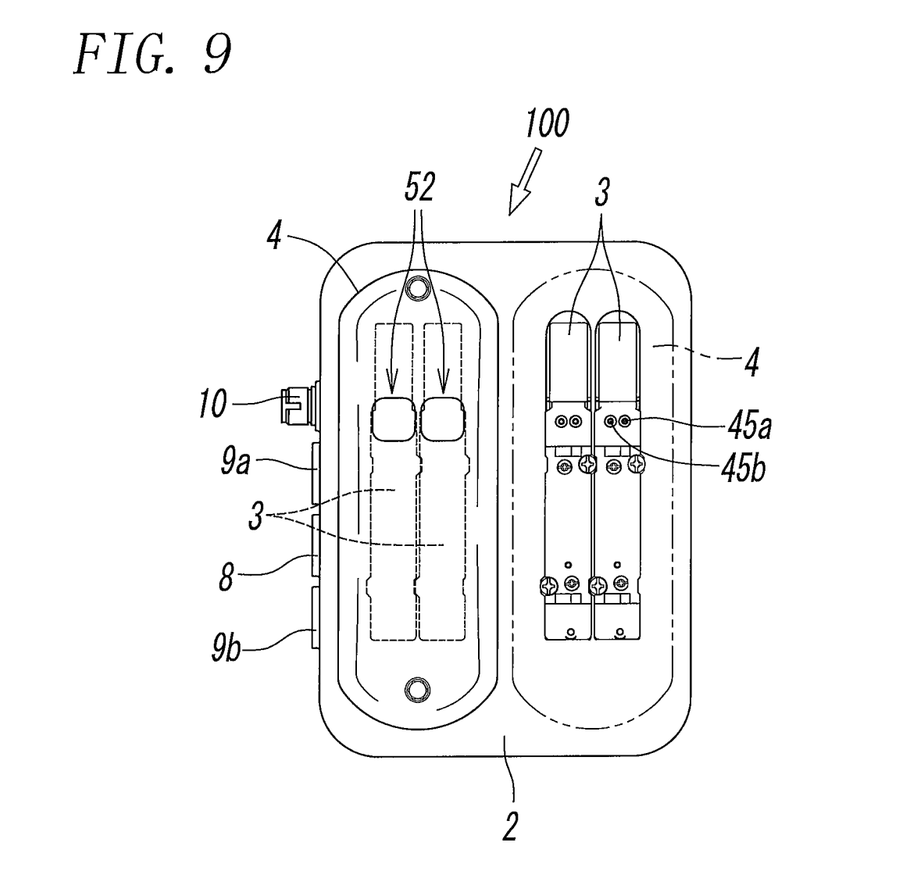
FIG. 9 is a plan view of a second embodiment of the waterproof solenoid valve according to the present invention, in which part of the waterproof cover is omitted.

In the case where the plurality of solenoid valve main bodies 3 is covered with the waterproof cover 4 altogether, the operation units 52 are provided at positions of the waterproof cover 4 corresponding to the manual units 45*a* and 45*b* of each solenoid valve main body 3.

REFERENCE SIGNS LIST 1, 100 WATERPROOF SOLENOID VALVE
2 MANIFOLD
3 SOLENOID VALVE MAIN BODY
4 WATERPROOF COVER
14 ELECTROMAGNETICALLY DRIVING MECHANISM
17 VALVE MEMBER
47 MANUAL BUTTON
52 OPERATION UNIT
53 OPERATION HOLE
54 CAP
55 PIN GUIDE
56 GUIDE HOLE
57 OPERATION PIN
60 BODY
61 HEAD
63 FITTING PORTION
64 PRESSING PORTION
71 FIRST GUIDE
72 SECOND GUIDE
73 LOCKING GROOVE
74 FALLING PREVENTION MECHANISM
75 WINDOW HOLE
76 LOCKING PORTION
77 LOCKING CLAW
L CENTRAL AXIS

The invention claimed is:

1. A waterproof solenoid valve in which one or more solenoid valve main bodies including a valve member that switches a channel, an electromagnetically driving mechanism that drives the valve member, and one or more manual buttons capable of manually switching the valve member are mounted on a manifold with a waterproof structure, the waterproof solenoid valve being covered with a waterproof cover attached to the manifold in a liquidtight manner,
wherein the waterproof cover includes, at a portion covering the manual button of the solenoid valve main body, an operation unit for pressing the manual button in a direction of a central axis,
wherein the operation unit includes a cap with flexibility attached to the waterproof cover in a liquidtight manner, a pin guide interposed between the cap and the solenoid valve main body, one or more operation pins inserted in a guide hole of the pin guide so as to be displaceable in the direction of the central axis,
wherein the cap includes a hollow body and a head covering one end of the body of the cap, the head including a flexible pressing portion that is elastically deformed at a pressing operation,
wherein the pin guide includes a first guide that is press-fitted in the body of the cap and a second guide connecting to the first guide,
wherein an outside diameter of the second guide is larger than an outside diameter of the first guide,
wherein the guide hole passes through the first guide and the second guide,
wherein the first guide has a locking groove around an outer periphery of the first guide,
wherein part of the body of the cap is fitted and retained in the locking groove, and
wherein one end of the operation pin is in contact with or close to the pressing portion of the cap, and another end of the operation pin is in contact with the manual button.

2. The waterproof solenoid valve according to claim 1, wherein the body of the cap is fitted in an operation hole formed in the waterproof cover, the first guide of the pin guide is press-fitted in the body of the cap to reach a position of the operation hole, and the body of the cap is strongly pressed between the first guide and an inner periphery of the operation hole to enhance a sealing performance between the cap and waterproof cover.

3. The waterproof solenoid valve according to claim 1, wherein the operation pin is inserted into the guide hole from one end of the pin guide, and wherein the operation pin and the pin guide have a falling prevention mechanism for preventing the operation pin inserted in the guide hole from falling off the pin guide.

4. The waterproof solenoid valve according to claim 3, wherein the falling prevention mechanism includes a window hole formed at a side wall of the guide hole so as to be elongated in the direction of the central axis, a locking portion formed at one end of the window hole, and a locking claw that is formed at a side of the operation pin and is fitted in the window hole so as to be displaced freely, and wherein the locking claw engages with the locking portion to prevent the operation pin from falling off the guide hole.

5. The waterproof solenoid valve according to claim 1, wherein the solenoid valve main body includes two manual buttons,
wherein the pin guide includes two of the first guides, two of the second guides, and two of the guide holes, wherein two of the operation pins are individually inserted in the two guide holes, the two first guides are separated from each other, and sides of the two second guides are connected together, and wherein the body of the cap includes two fitting portions in which the two first guides of the pin guide are individually fitted.

6. The waterproof solenoid valve according to claim 1, wherein the solenoid valve main body includes one manual button, wherein the pin guide includes two of the first guides, two of the second guides, and two of the guide holes, wherein two of the operation pins are individually inserted in the two guide holes, the two first guides are separated from each other, and sides of the two second guides are connected together, wherein the body of the cap includes two fitting portions in which the two first guides of the pin guide are individually fitted, and wherein, of the two operation pins, one operation pin corresponding to the manual button can be displaced freely, and another operation pin is fixed in a non-displaceable state.

* * * * *